March 12, 1957 P. C. SHERBURNE 2,784,962
ADJUSTMENT SCALES FOR SPRING DEVICES
Filed May 4, 1954 4 Sheets-Sheet 1

INVENTOR.
PHILIP C. SHERBURNE
BY
David D. McKenney
ATTORNEY

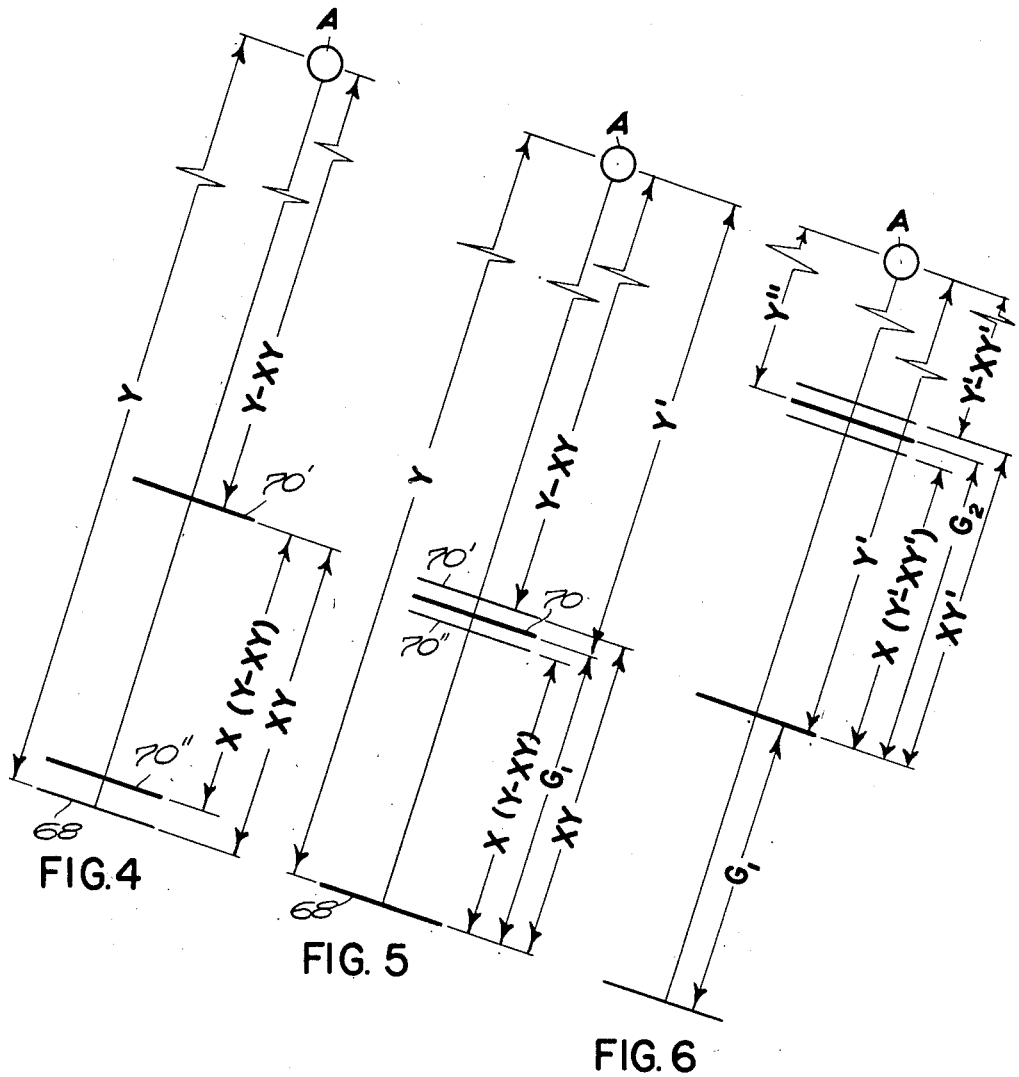

March 12, 1957  P. C. SHERBURNE  2,784,962
ADJUSTMENT SCALES FOR SPRING DEVICES
Filed May 4, 1954  4 Sheets-Sheet 3

INVENTOR.
PHILIP C. SHERBURNE
BY
David D. McKenney
ATTORNEY

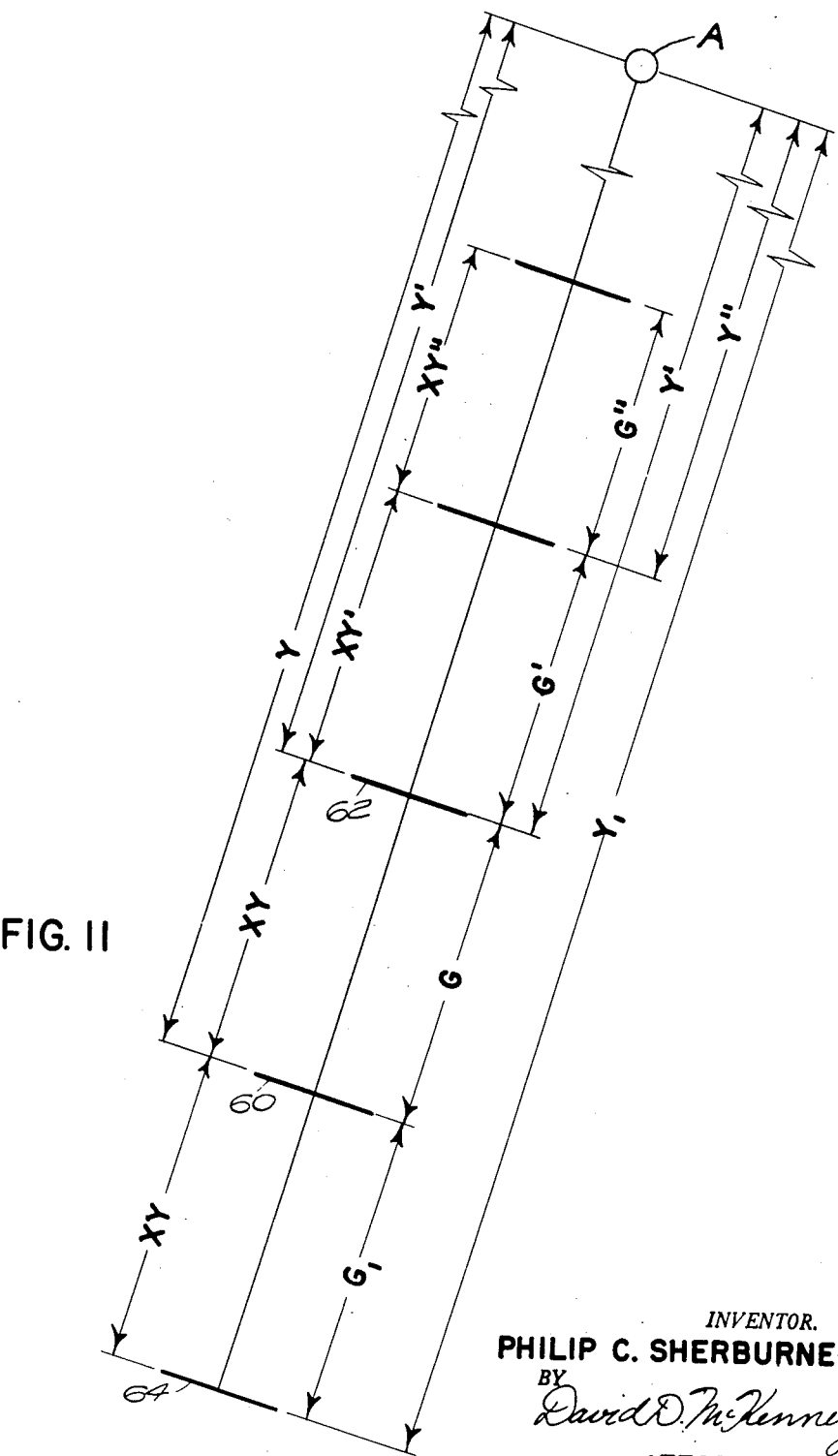

United States Patent Office 2,784,962
Patented Mar. 12, 1957

2,784,962

ADJUSTMENT SCALES FOR SPRING DEVICES

Philip C. Sherburne, Rumford, R. I., assignor to Grinnell Corporation, Providence, R. I., a corporation of Delaware Application May 4, 1954, Serial No. 427,586

10 Claims. (Cl. 267—1)

This invention relates generally to improvements in adjustment scales for spring devices which devices exert a substantially constant supporting force on a load movable vertically within a limited range and which scales permit accurate percentage adjustments of the supporting effort exerted.

Spring supports of the type to which this invention relates employ a pivoted lever to which the load is secured at a point spaced from the pivot so as to produce a turning moment in one direction and to which a spring is secured at the same point or at a different point spaced from the pivot so as to produce a turning moment in the opposite direction. A variety of suitable arrangements of these elements results in the opposed turning moment being substantially equal through at least a limited amount of lever rotation about the lever pivot. A typical spring support of this type is the hanger known in the trade as the constant support hanger for supporting piping which is subject to vertical movement due to changes in temperature. Inasmuch as the weight of the pipe, or load, which is to be supported by these devices varies over a considerable range, for example from 50 to 5000 pounds, manufacturers of constant support pipe hangers offer to the trade a number of hanger sizes each of which is capable of adjustment to exert any force within its portion of the load range.

In the normal course of events the purchaser of such a pipe hanger calculates in advance and as accurately as possible the weight of the particular section of piping he desires to support and orders from the hanger manufacturer a hanger of the size which includes this weight within its range. Thereupon, the hanger manufacturer prepares this size of hanger or selects it from those in stock, adjusts it to the load specified by the customer and stamps the scale with an arrow to show the adjustment for the specified load. The present invention is concerned with scales for use with adjustments such as this.

Because it frequently happens that the customer's initial calculation of the weight to be supported by the hanger is in error, the hanger arrives from its manufacturer incorrectly adjusted. Where such errors in calculation are discovered by the customer it is possible for field adjustments of the hanger by the customer by the use of the scale of the present invention. The customer need merely calculate the percentage difference between the actual load to be supported and the load the factory adjustment would support. Then by measuring off the number of graduations representing the desired percentage and adjusting the hanger to the selected scale graduation, the hanger can now support the actual load.

With further reference to the spring devices with which the adjustment scale is associated, the following description will be limited to a spring hanger of the constant support type providing perfect constant support such as is shown in the reissue patent to William S. Rouverol, Reissue Patent No. 24,050, issued August 9, 1955. However, it is to be understood that the present invention can be utilized with other spring devices whether of the perfect constant support hanger type or of some other type.

Heretofore, a scale has been proposed for use with spring hangers of the type presently to be described. That scale has a plurality of graduations thereon with one of the graduations representing a base point which is spaced from a fixed point of the spring hanger by a predetermined amount. Each of the graduations is spaced from an adjacent graduation by an amount equal to a given percentage increment of the value of the base point graduation which means that all the graduations are equally spaced.

In accordance with the procedure above described, the hanger is adjusted from the base point the required number of graduations to give the percentage change required according to the customer's initially calculated load. Then, upon delivery to the customer and upon finding that the actual load differs from the previously calculated load, the customer would have to revert to the base point for calculations and adjustments. If calculations and adjustments were made relative to the factory adjustment, the percentage increments represented by the graduations would be in error beyond allowable limits. For example, assume the base point is ten inches from the fixed pivot, relative to which adjustments are made, and that the base point represents that the hanger will support 1000 lbs. Now, in response to a customer's order for a hanger to support 800 lbs. The hanger is factory adjusted to a graduation representing a 20% percentage adjustment, i. e., two inches closer to the pivot. Upon receipt, the customer finds he was in error as to his calculated load and that actually his load is 10% greater, i. e. 880 lbs., but since the 10% graduations on the scale are based upon the ten inches —1000 lbs. load adjustment the customer cannot directly adjust the hanger the number of graduations representing 10%. If the customer did adjust through 10% on the scale the adjustment would actually give support to 900 lbs. or 700 lbs. rather than 880 or 720 lbs., depending upon the direction of adjustment, and it will thus be seen that the error in adjustment is around 2½% which is considerably greater than that which is considered to be allowable. While more accurate adjustment can be made by reverting to the base point such adjustment in the field becomes too complex for practical usage. It is always highly desirable in devices requiring field adjustment to have such adjustment as simple as possible and yet which will provide for adjustment with only limited error.

It is therefore a primary object of the present invention to provide an improved scale for use with spring devices which will obviate the objections of prior type scales, and which scale is simple yet accurate for adjustment of such spring devices.

Another object of the present invention is to provide an improved scale for use with spring devices wherein the graduations thereof are representative of preselected percentage increments and wherein limited adjustment can be made from any point on the scale according to the percentage graduations on the scale without significant or objectionable error.

Still another object of the present invention is to provide an improved scale adapted to be associated with spring hangers and the like, wherein the graduations of the scale represent preselected increments of percentage increases over and decreases from the value of any selected graduation of the scale.

A further object of the present invention is to provide an improved scale adapted for association with a spring hanger wherein each of the graduations of the scale is spaced from an adjacent graduation by an amount substantially equal to a preselected percentage increment of the value of the adjacent graduation.

A still further object of the present invention is to provide an improved scale adapted for association with a spring hanger wherein each of the graduations of the scale is spaced from an adjacent graduation by an amount which is less than the calculated spacing from the first mentioned graduation for a given percentage decrease in the spring force represented by that graduation and greater than the calculated spacing from the adjacent graduation for an increase of the same given percentage over the spring force represented by that adjacent graduation.

Still another object of the present invention is to provide an improved scale for association with a spring hanger wherein the scale has a plurality of graduations, each having a predetermined value and each pair of graduations being spaced apart by an amount determined by the formula:

$$G = XY \pm \frac{X^2Y}{2}$$

wherein G is the spacing from a given graduation to be found, X equals the percentage increment of the graduations expressed as a fraction, and Y is the value of the one graduation from which the spacing for the next graduation is to be calculated.

Various other objects and advantages will become apparent from the description to follow:

In the drawings:

Figures 4, 5 and 6 are somewhat diagrammatic showings of the preferred manner in which the spacings of the graduations of the scale are calculated;

Figure 11 is a somewhat diagrammatic showing of another manner in which the spacings of the graduations can be calculated.

Figure 1:
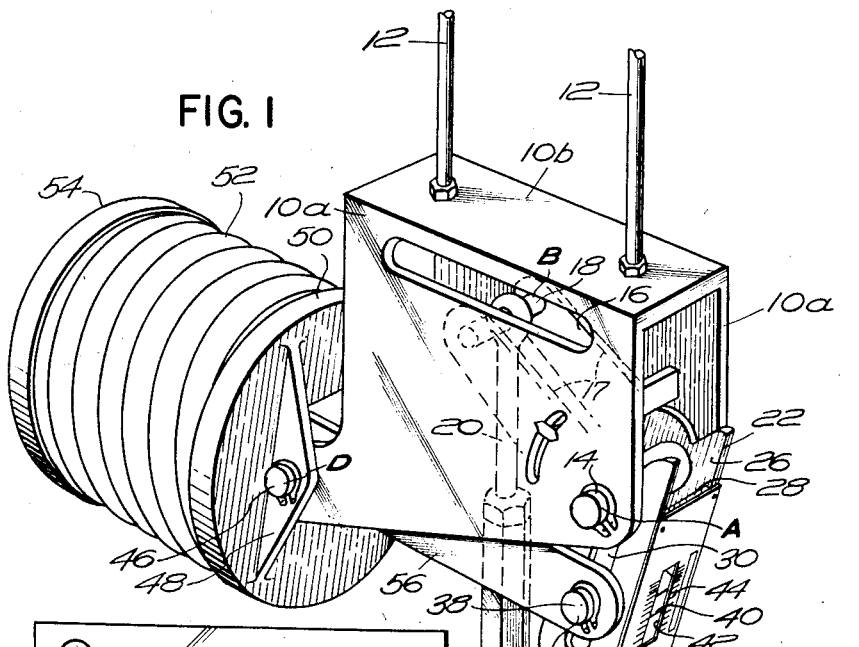
Figure 1 is a perspective view of a constant support spring hanger showing a scale of the present invention applied thereto.
Figure 2:
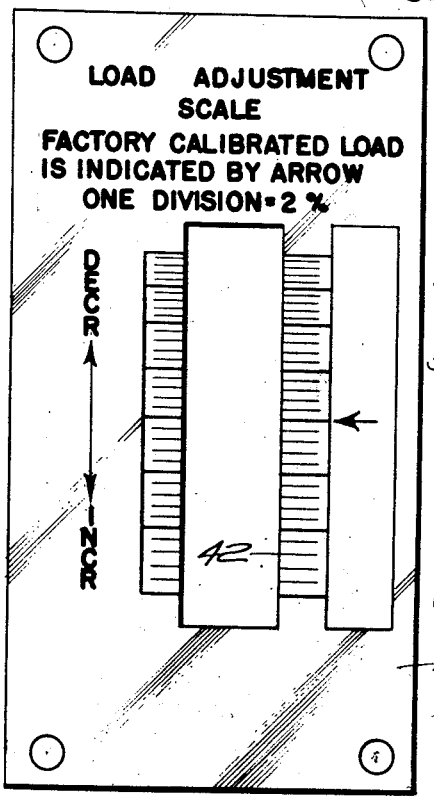
Figure 2 is an enlarged detail plan view of an actual scale embodying the principles of my invention.
Figure 3:
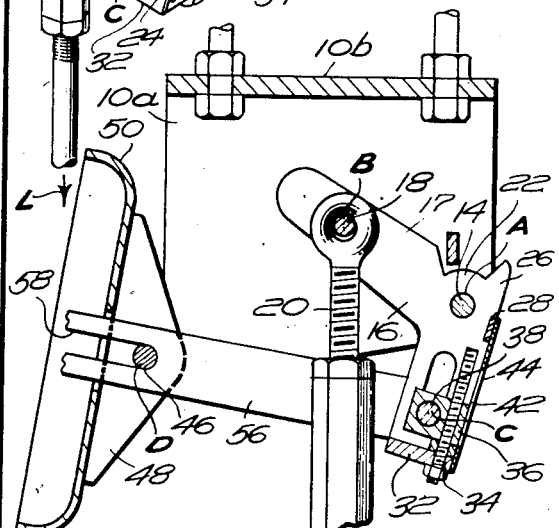
Figure 3 is a vertical longitudinal sectional view through the hanger of Figure 1.

Referring now more particularly to the drawings and especially Figures 1 and 3 it will be seen that the constant support hanger is comprised of a simple U-shaped frame 10 with a top plate 10b which can be secured to some fixed overhead structure by one or more tie rods 12. Depending side plates 10a extend vertically downward from the top plate. The side plates 10a provide journals for the shaft 14 which carries the bell crank 16 for rotation between the side plates about the axis A. The ends of crank arms 17 are joined by a short shaft 18 the axis of which is marked B. A hanger rod 20 is pivotally mounted on the short shaft 18 between the crank arms and may be connected in any suitable manner to load L which, as here indicated, hangs from the spring support. Crank arm 22 is substantially U-shaped in cross section with its side portions 24 and 26 being integral with the arms 17 and joined by the bight portion 28. The side portions 24 and 26 are provided with elongated slots 30 which are in a plane substantially radial with respect to the axis A. Portions 24, 26 and 28 are provided at their outer ends with an end plate 32 through which an adjustment bolt 34 extends for rotatable nonaxial movement. A block 36 internally threaded to receive the bolt 34 is engaged between the side portions 24 and 26 for axial and non-rotary movement in response to rotation of the adjustment bolt 34. The block has a transversely extending pin 38 therethrough with the ends of the latter extending outwardly through the slots 30 and defining an axis C adjustable toward and from the axis A by the bolt 34. The block 36 has a transverse marking 40 showing through an elongated slot 42 in a scale plate, the latter being in accordance with the present invention.

The side plates 10b are joined by a shaft 46 which provides a fixed pivotal axis D for a pair of outstanding separated bearings 48 on the end plate 50 for the spring 52. The other end of the spring 52 rests against the cupped end plate 54, which end plate has a pair of levers 56 substantially fixedly extending therefrom through the spring 52 and end plate 50 for pivotal connection with the pin 38. Intermediate its ends, the levers 56 each has an elongated slot 58 receiving the shaft 46 therethrough whereby the levers are slidably pivotally supported on the shaft 46. The levers are pivotally connected with the pin 38 for adjustment with the block toward and from the axis A while pivoting on the shaft 46.

As explained in the Rouverol patent referred to:

(1) Load moment $= L(W \sin \theta)$ where L is the load, W is the length of AB and $\theta$ is the angle AB makes with the vertical.

(2) $\qquad$ Spring moment $= F\dfrac{(YZ \sin \phi)}{\Delta}$ where F is the spring constant K times the spring deflection E, $Y = AC$, $Z = AD$, $\phi =$ the angle between AC and AD and $\Delta = CD$.

thus:

$$\text{Spring moment} = KE\frac{(YZ \sin \phi)}{\Delta}$$

For perfect support load moment = spring moment (3) $\qquad LW \sin \theta = KE \dfrac{YZ \sin \phi}{\Delta}$ By design $\theta = \phi$ and $E = \Delta$ thus:

(4) $\qquad\qquad LW = KYZ$ (5) $\qquad\qquad L = \dfrac{KYZ}{W}$

Equation 5 holds true for all positions of the load within its travel range and since K, Y, Z and W are constant there is perfect constant support.

If the spring force exerted is not sufficient for the load in a given spring hanger problem, it will be seen that W, Y and Z can be made adjustable so as to adjust the spring moment without affecting the perfect constant support for the new load. As shown the adjustment is made along Y(AC) but it will be understood that other equally satisfactory provisions for adjustment can be utilized. The Rouverol patent in Fig. 1 shows adjustment along line Z(AD). The important point to note is that by an adjustment along line Y or Z of a given percentage of Y or Z, the load the hanger will support will be changed by the same percentage.

In order to facilitate such adjustments, the bolt and block arrangement above described is provided and the improved scale 44 associated therewith.

In Figure 11 one method of forming a graduated scale is taught. A reference or base point 60 is selected and its distance from the pivot A is measured so as to assign a value Y to the graduation 60. Assuming that it is desired to have a scale with an X% increment between graduations, XY is calculated and the spacing G is set as equal to XY so as to give the graduation 62. The value of graduation 62 is equal to $Y - XY$ and for convenience this value is given as Y' the distance graduation 62 lies from the pivot A. G' equal XY' and G" equals XY". Going in the opposite direction graduation 64 is spaced G or XY distance from 60 and is spaced $Y + XY$ or $Y_1$ distance from A.

Figures 4, 5 and 6 show my preferred manner of laying out the improved scale. In Figure 4 a base point 68 on the scale is selected for the first graduation and its distance Y from the pivot A gives this graduation a value corresponding to Y in the Equations 1-5. After selecting the desired percentage increment X, XY is measured from 68 to 70'. This leaves the point 70' a distance from the pivot A equal to $Y-XY$, so $X(Y-XY)$ is measured from 70' to 70" and then in Figure 5 the distance $X(Y-XY)$ is measured from 68 so as to position the two points 70' and 70" close together. Next the distance between the points 70' and 70" is divided in two to get point 70, or, in other words, the distances XY and $X(Y-XY)$ are averaged.

Algebraically expressed:

$$G_1 = \frac{XY + X(Y-XY)}{2}$$

$$G_1 = \frac{XY + XY - X^2y}{2} = XY - \frac{X^2Y}{2}$$

Where $G_1$ is the distance from the given graduation to the next adjacent graduation to be located going toward the pivot A, X is the selected percentage increment expressed as a fraction or decimal, and Y is the distance between a known graduation, as the graduation given to begin with, and the pivot A.

After the graduation 70 is located the procedure is as in Figure 6 using Y' instead of Y.

Of course, when determining the spacing for graduations spaced farther from the pivot than the given graduation, the formula works out to:

$$G = XY + \frac{X^2Y}{2}$$

and more generally expressed for determining graduations located closer to or farther from the pivot than the given graduation:

$$G = XY \pm \frac{X^2Y}{2}$$

With reference to the foregoing it should be remembered that one of the important objects of the present invention is to provide a scale wherein percentage change can be measured from any point thereon and in either direction.

Thus what has been done in Figures 4, 5 and 6 is to calculate, for example, 2% of Y and measure it from 68. Then assuming 70' to be the given graduation, knowing its distance from the pivot A to be $Y-.02Y$ we calculate to see what the graduation spacing would be for a 2% increase of the value $Y-.02Y$ of point 70' and we find that we would not get back to point 68. In order to minimize the error when using the same scale for increases as well as decreases in spring force, the two measurements representing a 2% decrease from one point and a 2% increase from the other point are averaged to give a graduation spacing that is sufficiently accurate for use in increasing as well as decreasing the spring force by adjustment. There is a limit to the accuracy of this scale and since an allowable error in adjusting spring hangers is about ½ of 1%, by using 2% graduations, adjustments of up to about 10% about any point on the scale are permissible.

Figure 10:
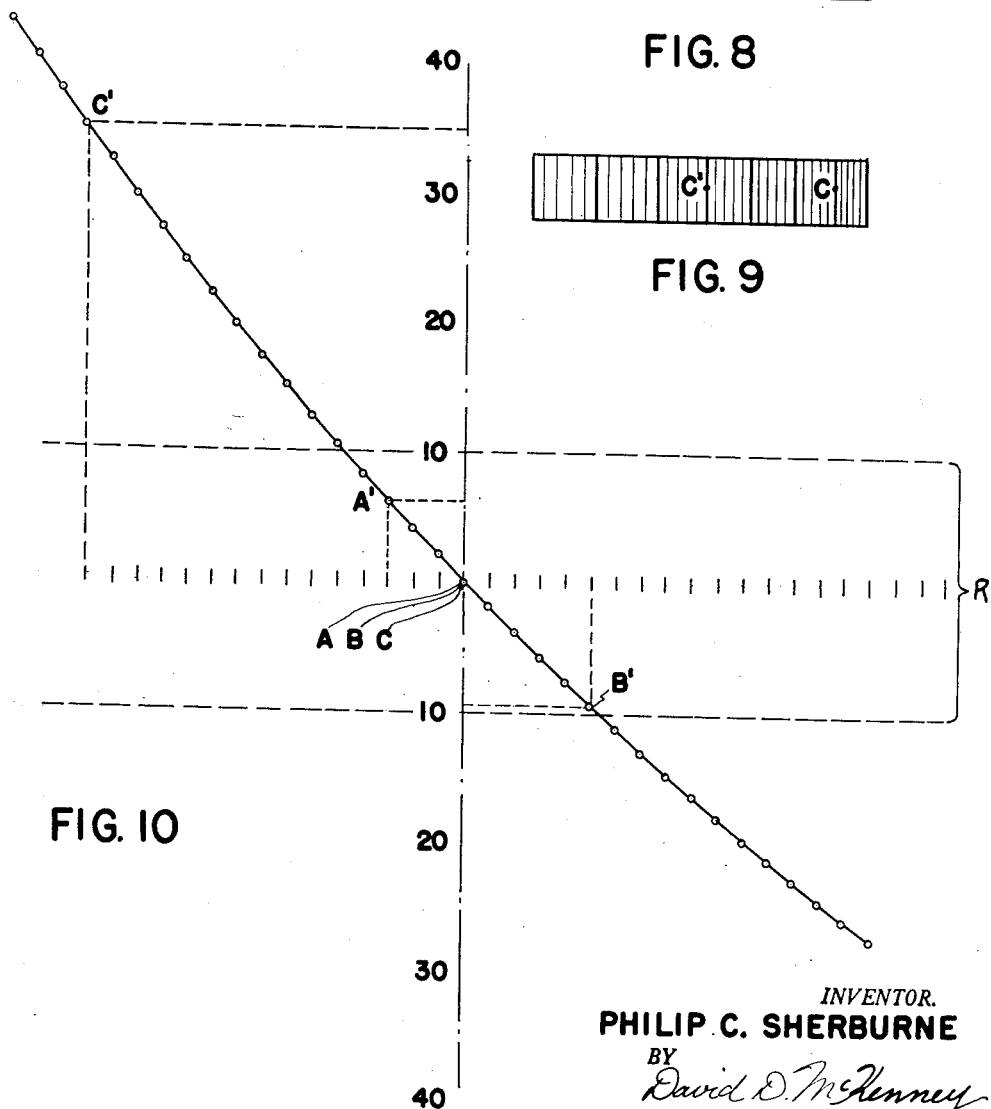
Figure 10 is a graph showing a curve formed from a plot of actual percentage change against the scale indicated percentage change.

Figure 10 includes a curve which shows how the actual percentage change in spring force varies compared with the scale percentages, with the zero point representing any point on the improved scale. Within the allowable 10 percent adjustment range R, the error between the scale and actual percentages is shown to be about ½ of 1%.

To calculate the percentage changes, the difference in values of the base point and the graduation in question is divided by the value of the base point. Thus, for example: Where the base point has a value 1.875 and the graduation in question has a value (spacing from the pivot) of 2.5335, the difference is .6585 and the quotient is .3779 or 37.79%. The 2.5335 actually represents a scale percentage change of 30% determined in accordance with the last given general formula and using X as equal to 2% increments. Consequently, the curve shows the difference between the actual percentage change for a scalar percentage change. However this difference is negligible within a 10% change from any given scalar adjustment.

Figure 7:
Figures 7, 8 and 9 are somewhat diagrammatic showings of similar scales with different initial settings and different field adjustments required.

Looking now at Figures 7 and 10, let it be assumed that a customer ordered a hanger for a certain load which required factory adjustment to point A on the scale and suppose the customer was in error by 6%, the load actually being 6% greater than previously calculated. By the use of the present scale, the customer can make a field adjustment by merely adjusting the bolt 34 so that the marking 40 moves three scale graduations of 2% each away from the pivot to graduation A'. As seen on the curve the actual percentage change in load is substantially the same as the scale change of 6%.

Figure 8:

In Figures 8 and 10, where the customer has a hanger adjusted to point B and finds that a 10% decrease in spring force is necessary to perfectly support his load, the field adjustment merely involves adjustment toward the pivot through five graduations of 2% each to graduation B'. The actual percentage change in load is shown on the curve to be substantially 10% with allowable error.

Figure 9:

As has been explained, because of the limit on the error allowed in such adjustments, a 10% adjustment to either side of any point is permitted, but sometimes it is necessary for an adjustment greater than 10% to be made. In such cases the scale can still be used but the curve must be consulted. Thus looking at Figures 9 and 10, where a 35% greater load has to be supported, the actual percentage is translated into scale percentage by the curve and the hanger is then adjusted according to the scale percentage thus ascertained. Here again, the error is negligible. The scale makes possible adjustments of up to 10% directly, or greater adjustments indirectly by use of the curve with allowable error.

From the foregoing it will be seen that I have provided an improved scale which fulfills the objects hereinbefore set forth.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A scale calibrated for spring hanger adjustments wherein each hanger is initially adjusted to exert a spring force which may differ from the actual load by a calculated percentage, said scale having graduations thereon, the spacing between each pair of said graduations being substantially indicative of preselected increments of percentage increase and decrease in spring force which the hanger can be adjusted to exert, one of said graduations representing a base point of predetermined value, and an adjacent graduation being spaced therefrom by an amount substantially equivalent to the preselected percentage increment of said predetermined value of the base point, and each subsequent graduation being spaced from its preceding adjacent graduation by an amount substantially equivalent to the preselected percentage increment of the value of the preceding graduation and wherein the value of any selected graduation is equal to the sum of the base point value and the spacing between the base point and the selected graduation.

2. A scale calibrated for spring hanger adjustments wherein each hanger is initially adjusted to exert a spring force which may differ from the actual load by a calculated percentage, said scale having a plurality of graduations thereon, the spacing between each pair of graduations being substantially indicative of preselected increments of percentage increase and decrease in spring force which the hanger can be adjusted to exert, one of said graduations being spaced from an axis of said hanger relative to which the adjustment is made so as to represent a determinable value, and an adjacent graduation being spaced therefrom by an amount substantially equivalent to the preselected percentage increment of said value of said one graduation, and each subsequent graduation being spaced from its preceding adjacent graduation by an amount substantially equivalent to the preselected percentage increment of the value of the preceding graduation and wherein the value of any selected graduation is equal to the sum of the value of said one graduation and the spacing between said one graduation and the selected graduation.

3. A scale calibrated for a spring device adapted to exert a substantially constant force on a load movable within a limited range and said device having a component linearly adjustable so as to proportionately vary the spring force, said scale being associated with said linearly adjustable component and having graduations thereon the spacing between which graduations is substantially indicative of preselected increments of percentage increase and decrease which the device can be adjusted to exert, one of said graduations representing a base point of predetermined value, an adjacent graduation being spaced therefrom by an amount substantially equivalent to the preselected percentage increment of said predetermined value of the base point, and each subsequent graduation being spaced from its preceding adjacent graduation by an amount substantially equivalent to the preselected percentage increment of the value of the preceding graduation and wherein the value of any selected graduation is equal to the sum of the base point value and the spacing between the base point and the selected graduation.

4. In a spring device adapted to exert a force on a movable load, said device having a pivot and a component linearly adjustable toward and from said pivot so as to proportionately vary the spring force, a scale substantially parallelly associated with said linearly adjustable component and having graduations thereon the spacing between which graduations is substantially indicative of preselected increments of percentage increase and decrease which the device can be adjusted to exert, one of said graduations representing a base point of predetermined value, an adjacent graduation being spaced therefrom by an amount substantially equivalent to the preselected percentage increment of said predetermined value of the base point, and each subsequent graduation being spaced from its preceding adjacent graduation by an amount substantially equivalent to the preselected percentage increment of the value of the preceding graduation and wherein the value of any selected graduation is equal to the sum of the value of the base point and the selected graduation.

5. A calibrated scale for spring hanger adjustments wherein each hanger is initially adjusted to exert a spring force which may differ from the actual load by a calculated percentage, said scale having graduations thereon substantially indicative of increments of percentage increase and decrease in spring force which the hanger can be adjusted to exert, each of said graduations representing a spring force, and the spacing between each pair of said graduations being less than the calculated spacing from one of the graduations of the pair for a given percentage decrease in the spring force represented by that one graduation and greater than the calculated spacing from the other graduation of the pair for an increase of the same given percentage over the spring force represented by that other graduation.

6. A calibrated scale for spring hanger adjustments wherein each hanger is initially adjusted to exert a spring force which may differ from the actual load by a calculated percentage, said scale having graduations thereon substantially indicative of increments of percentage increase and decrease in spring force which the hanger can be adjusted to exert, the spacing between each pair of said graduations being substantially equal to the average of the calculated spacing from one of each pair of graduations for a decrease in spring force of a given percentage and the calculated spacing from the other of each pair of graduations for an increase in spring force of the same given percentage.

7. In a spring hanger of the type having a lineal adjustment directed substantially toward one of the pivots thereof whereby the spring force of the hanger is proportionately adjusted, a scale adapted to cooperate with said lineal adjustment and having graduations thereon indicative of increments of percentage increase and decrease in spring force to which the hanger can be adjusted, the spacing between each pair of graduations representing both an increase and a decrease in spring force of a given percentage depending upon the direction of adjustment relative to said pivot, and said spacing between each pair of graduations being less than the calculated spacing from one of each pair of graduations for a decrease in spring force of a given percentage from the one graduation and greater than the calculated spacing from the other of each pair of graduations for an increase in load of the same given percentage from the other graduation so that the one scale can be utilized for adjusting the spring force for increases and decreases in load.

8. A scale comprised of a plurality of graduations, each of said graduations having a predetermined value, and each graduation being spaced from an adjacent graduation by an amount determined by the formula:

$$G = XY \pm \frac{X^2Y}{2}$$

wherein G is the spacing from said adjacent graduation to be found, X equals the percentage increment between adjacent graduations expressed as a fraction, and Y is equal to the value of said adjacent graduation.

9. In a constant support hanger of the type described wherein adjustment of the spring force exerted is made substantially along one of the arms of a hanger toward and from the pivot therefor, an improved adjustment scale associated with said one arm so as to be substantially parallel with the line of adjustment, said scale having a plurality of graduations spaced from said pivot and each graduation being spaced from an adjacent graduation by an amount determined by the formula:

$$G = XY \pm \frac{X^2Y}{2}$$

wherein G is the spacing to be found, X equals the selected percentage increment between adjacent graduations expressed as a fraction, and Y is the distance the adjacent graduation lies from the pivot.

10. In a constant support hanger of the type described wherein adjustment of the spring force exerted is made substantially along a line radial with respect to a fixed pivot of the hanger, an improved adjustment scale associated with said hanger so as to be substantially parallel with said line of adjustment, said scale having a plurality of graduations spaced from said fixed pivot and each graduation being spaced from an adjacent graduation by an amount determined by the formula:

$$G = XY \pm \frac{X^2Y}{2}$$

wherein G is the spacing from the adjacent graduation to be found, X equals the selected percentage increment between adjacent graduations expressed as a fraction, and Y is the distance the adjacent graduation lies from the fixed pivot.

References Cited in the file of this patent

UNITED STATES PATENTS

| | | | |
|---|---|---|---|
| 2,208,064 | Wood | July 16, | 1940 |
| 2,615,708 | Rouverol | Oct. 28, | 1952 |
| 2,618,449 | Kohler | Nov. 18, | 1952 |